United States Patent [19]

Flory et al.

[11] 4,215,368
[45] Jul. 29, 1980

[54] MEMORY ADDRESSING SYSTEM FOR AUTOMATIC SETUP TV CAMERA SYSTEM

[75] Inventors: Robert E. Flory, Princeton; Mark R. Nelson, Stratford, both of N.J.

[73] Assignee: RCA Corporation, New York, N.Y.

[21] Appl. No.: 20,851

[22] Filed: Mar. 15, 1979

[51] Int. Cl.$^2$ .......................... H04N 7/02; H04N 5/14
[52] U.S. Cl. ..................................... 358/139; 358/107; 358/160
[58] Field of Search ........................ 358/139, 107, 160

[56] References Cited
U.S. PATENT DOCUMENTS

| | | | |
|---|---|---|---|
| 3,578,904 | 5/1971 | Dewey | 358/107 |
| 4,115,804 | 9/1978 | Morton et al. | 358/107 |
| 4,115,805 | 9/1978 | Morton | 358/107 |
| 4,133,003 | 1/1979 | Flory et al. | 358/51 |
| 4,141,040 | 2/1979 | Dischert et al. | 358/160 |

Primary Examiner—Howard W. Britton
Attorney, Agent, or Firm—Eugene M. Whitacre; Paul J. Rasmussen; Robert L. Troike

[57] ABSTRACT

An automatic television camera setup system includes a memory for storing the measured data detected from the camera viewing a setup chart. Addresses for and control of the data to be stored in the memory is provided by left, center, and right column counters where the left counter increments in response to features detected at the left side of the television raster, the center column counter increments in response to features detected at the horizontal center of the television raster and the right column counter increments in response to features detected at the right side of the television raster. A 2-bit address is also associated with which of the left, center or right side of the raster is being scanned.

6 Claims, 4 Drawing Figures

MEMORY ADDRESSING SYSTEM FOR AUTOMATIC SETUP TV CAMERA SYSTEM

BACKGROUND OF THE INVENTION

This invention relates to a memory address system and more particularly to a memory address and control system for providing memory address for measured video signals from a television camera undergoing automatic setup when viewing a test chart.

In systems for automatically adjusting the geometry or video levels of the three color channels of a highquality color TV camera, it is necessary to measure the parameters to be adjusted, and store the data for calculation of errors and required corrections. Such measuring techniques and discussed in U.S. Pat. No. 4,133,003 of Flory and Oakley and U.S. Pat. No. 4,141,040 of Dischert and Flory. Also for a discussion of the automatic system see "AUTOMATIC SETUP SYSTEM FOR TELEVISION CAMERAS," of Brian Astle and Robert Dischert, International Application filed under the Patent Cooperation Treaty, Ser. No. PCT/US79/00099, filed Feb. 22, 1979 and "AUTOMATIC SETUP SYSTEM FOR TELEVISION CAMERAS," of Robert Dischert, U.S. Application Ser. No. 894,008, filed Apr. 6, 1978.

Current technology usually specifies digital data storage, and therefore digital words must be generated for the addresses in memory where each data word will be stored.

In the camera system cited above the main spatial and video level functions are measured in nine locations on the raster. An array of (objects or blocks) features on a test chart comprise the test pattern used when measurements are made. It is possible to measure all spatial or level errors in one field, so it is necessary to generate addresses for all video locations in real time, to allow a single set of measurement hardware to measure at all locations, each in turn, with time to transfer data to memory and reset measuring system—all before the next location is reached.

If video is used to generate addresses for data storage, it is essential that addresses correspond only to valid video. Any stray specks of dirt or other camera tube or test chart flaws can cause false addressing. Since the scanning of the test chart by the standard TV scan proceeds in an orderly fashion side-to-side and top-to-bottom, it should be possible to address the memory by counting video pulses in order of the scan in a digital counter. In fact, if the chart is rotated with respect to the camera pickup tube, this order cannot be assured.

SUMMARY OF THE INVENTION

A system for generating memory address and controlling the measured data applied to a digital memory includes a detector for detecting the presence of a feature on a TV camera test chart. A first gating signal is generated when a first horizontal portion of the TV raster is being scanned and a second gating signal is generated when a second horizontal portion of the TV raster is being scanned. A first and second address generator provides addresses in the order of the features detected in the first and second horizontal portion of the TV raster respectively. The addresses from the first generator are applied to the memory as addresses together with binary signals indicative of the first width portion when said first width portion is being scanned and the addresses from the second generator are applied to the memory as addresses together with binary signals indicative of the second width portion when said second width portion is being scanned.

DESCRIPTION OF PREFERRED EMBODIMENT

Figure 1:
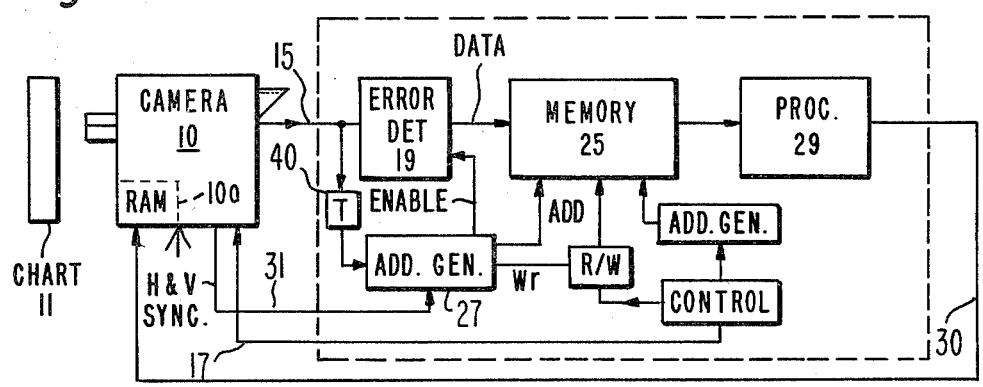
FIG. 1 is a block diagram of the overall camera setup system.

Referring to FIG. 1, there is illustrated an automatic setup system for a color television camera. The camera 10 is optically focused on a setup chart 11. The setup chart 11 is positioned in a controlled manner relative to the camera 10. The camera 10 is a color television camera and produces from three pickup devices the three color signals of red, green, and blue for example. The camera 10 in addition to the pickup devices includes, the deflection devices and circuitry and the processing circuitry responsive to the scanned signals picked up from the pickup devices for producing the red, green, and blue video signals. These red, green, and blue signals are applied to a video selector switch in the camera. The particular camera system 10 is like that described in U.S. Application, Ser. No. 894,008, filed Apr. 6, 1978 entitled, "AUTOMATIC SETUP SYSTEM FOR TELEVISION CAMERA," of Robert A. Dischert and described in International Application filed under the Patent Cooperation Treaty, Ser. No. PCT/US79/00099, filed Feb. 22, 1979 entitled, "AUTOMATIC SETUP SYSTEM FOR TELEVISION CAMERAS," of Brian Astle and Robert A. Dischert. The camera itself is more particularly described in the first mentioned reference. In this particular camera system a RAM (Random Access Memory) 10a stores the control values of the camera in an 8-bit binary code format according to predetermined address locations. The camera 10 includes a timing control which generates horizontal and vertical sync timing signals for scanning and controlling the processing of the signals. The horizontal timing signals are used for providing the addresses to the RAM 10a in the camera for thereby providing control signals via D/A converters (digital to analog) to the control circuitry of the camera.

The video signals from the camera 10 are applied via leads 15 to an automatic setup unit 13 for measuring the errors in the video signal and generating error correction signals with addresses to be applied to the RAM 10a in the camera for adjusting the camera in a corrective sense. A more detailed description of the automatic setup unit is described in the previously cited references. The automatic setup unit 13 provides a control signal via lead 17 to the video switcher in the camera to select which video is applied to the automatic setup unit 13 to be detected.

The video from the camera 10 is applied to an error detector 19 in the automatic setup unit 13. There are several types of error detectors in detector unit 19. There are error detectors for detecting coarse registration of the three color video signals, geometry, axis shading, white level, black level, and fine registration.

These error detectors are more specifically discussed in the above cited applications and in U.S. Pat. No. 4,141,040 Robert A. Dischert et al and U.S. Pat. No. 4,133,003 of Flory et al. In the system described the errors are detected on a region by region basis with the chart having nine regions of similar setup features thereon.

Figure 2:
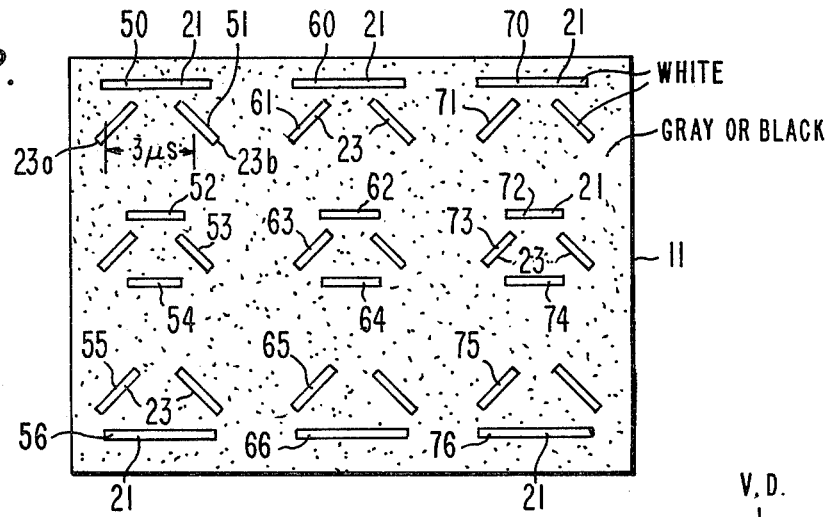
FIG. 2 is a sketch of the setup chart in the system of FIG. 1.

Referring to FIG. 2, there is illustrated setup chart 11. The chart 11 has on a gray or black background twelve horizontal white bars or blocks 21 and nine white chevrons (a pair of diagonal marks extending at an angle toward each other) 23. The left diagonal mark 23a of the chevron 23, extends upward at an angle reading from left to right while the right diagonal mark 23b extends downward at approximately the same angle reading from left to right. The two chevron marks would cross toward the top of the chart if they were extended.

Across the top portion of the chart are three clusters of features arranged in a row with each cluster in the top row including a white horizontal bar above a chevron. Across the bottom portion of the chart are three clusters of features arranged in a row with each cluster including a white horizontal bar below a chevron. Across the middle portion of the chart are three clusters of features arranged in a row with each cluster including a white horizontal bar above and below a chevron. The top, middle, and bottom clusters of features are arranged in vertical columns to thereby provide nine clusters of features for measuring regional errors in these nine regions.

The regional errors measured in the regions of the feature clusters are applied as data to a digital memory 25 (FIG. 1) which may be for example a RAM. These error signals or measurement data are stored in the memory according to addresses provided by an address generator 27. The address generator 27 is responsive to the video from the camera 15 via threshold 40 for detecting the presence of a feature such as the white bar or the chevron for generating addresses for each feature, enabling the data from the error detector 19 and providing a write enable via R/W switch (read/write) to the memory 25. The error detected data in the memory is then applied via read control signals and a read address generator to a processor 29 where correction signals with addresses are generated as discussed in the previously cited application of Dischert and application of Astle and Dischert. These correction signals with appropriate address for RAM 10a are applied via lead 30 to the RAM 10a in the camera 10. The address generator 27 to be discussed in more detail is responsive to horizontal and vertical synchronizing signals from the camera deflection control circuitry via leads 31.

Figure 3:
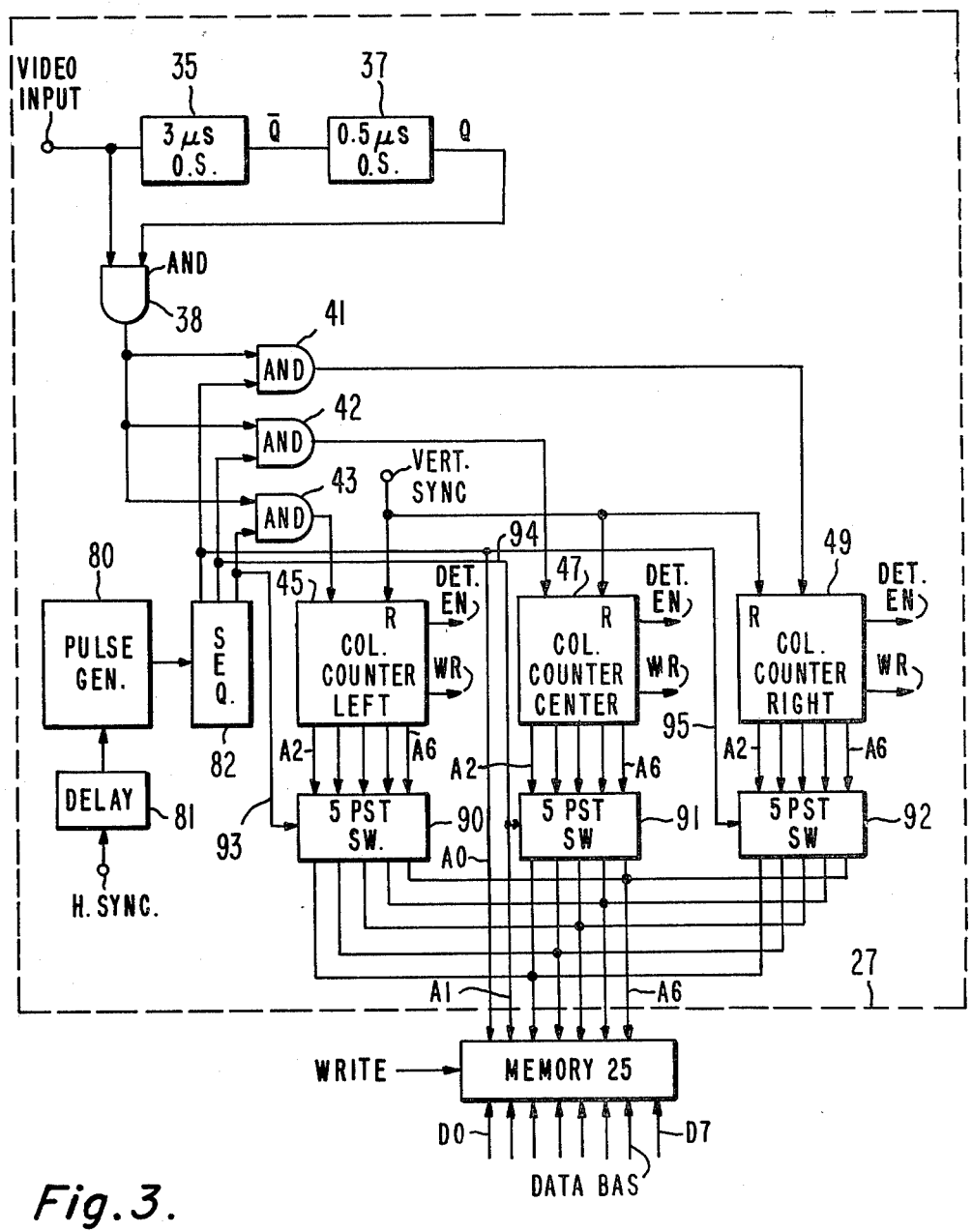
FIG. 3 is a block diagram of the addressing and memory control system in the camera setup system of FIG. 1.

Referring to FIG. 3, there is illustrated the address generator 27 and the digital memory in the automatic setup unit 13. The video signals from the camera are applied to a three microsecond delay one-shot monostable multivibrator 35. After three microseconds a high level signal is applied to one-shot monostable multivibrator 37 for providing a 0.5 μsec pulse to AND gate 38. If the video pulse indicating a white bar or chevron is at least 3 microseconds long or if two pulses 3 to 3.5 microseconds apart occur, the system indicates that a feature on the chart has been detected. The white bar in the test chart is considerably over three microseconds long. At the vertical center of each chevron the horizontal spacing in scan time between the leading edge of the left chevron mark (mark 23a for example) and the leading edge of the right chevron mark (mark 23b for example) is three microseconds. Therefore this system detects both types of features while at the same time distinguishing from stray white objects. The chart features to be measured are white so that black defects in the dark background will not affect the address generation. The input video is applied via a threshold detector 40 before being applied to the one-shot monostable multivibrator 35 delay and AND gate 38. The verified output signal indicating a detected feature is applied to AND gates 41, 42, and 43.

The address generator includes three counters 45, 47, and 49 which are reset after every television field by a vertical sync signal from the camera control. Counter 45 is coupled to the output of AND gate 43, counter 47 is coupled to the output of AND gate 42, and counter 49 is coupled to the output of AND gate 41. Counter 45 counts the features (white blocks and chevrons) 50, 51, 52, 53, 54, 55, and 56 in the left vertical column of chart 11 or on the left side of the television raster. A pulse generator 80 is responsive to a delayed signal from horizontal camera sync for providing three successive 17.5 microsecond pulses. The delay from delay 81 is such that the first pulse begins at the start of the active picture time following horizontal sync. The three pulses are sequenced via sequencer 82 to AND gates 43, 42, and 41 in that order. The first 17.5 microsecond pulse enables AND gate 43 such that if a feature is detected the left column counter 45 is incremented. The second 17.5 microsecond pulse enables AND gate 42 and if a feature 60, 61, 62, 63, 64, 65, or 66 is detected in the center column (center of the raster) this increments the counter 47. Similarly the third 17.5 microsecond pulse enables AND gate 41 and if a feature 70, 71, 72, 73, 74, 75, or 76 is detected this increments the right column (right side of the raster) counter 49. The counters 45, 47, and 49 are incremented in the order of the features in the corresponding columns and are reset each field. The counters may also increment for several lines in each feature as to be discussed further in connection with FIG. 4. The counters 45, 47, and 49 as they are incremented each produce binary addresses $A_2$ through $A_6$. The addresses $A_2$ through $A_4$ (3-bits) indicate which of the seven features (for example 50 through 56) are being detected. The addresses $A_5$ and $A_6$ indicate which of the horizontal lines of the feature are being detected.

The five binary signals from the left column counter 45 are applied via five pole single throw switch 90 to the $A_2$ through $A_6$ address inputs of memory 25. Similarly the five binary signals from the center column counter 47 are applied via five pole single throw switch 91 to the $A_2$ through $A_6$ address inputs of memory 25 and the five binary signals from the right column counter 49 are applied via five pole single throw switch 92 to the $A_2$ through $A_6$ address inputs of memory 25. The enable inputs to AND gates 41 and 42 are applied to the $A_0$ and $A_1$ address inputs of memory 25 to indicate which column (left, center, or right) the features are located in, or which horizontal width portion of the raster is being scanned. The first pulse from sequencer 82 to switch 90 via lead 93 gates the output only from the left column counter 45. The second pulse from the sequencer 82 to switch 91 via lead 94 gates the output only from the center column counter and the third pulse from the sequencer 82 to switch 92 via lead 95 gates the outputs only from the right column counter. The data on the data bus $D_0$ through $D_7$ are stored in the memory 27 according to the addresses from these counters 45, 47, and 49. A write and a detector enable is provided at each of the column counters.

Figure 4:
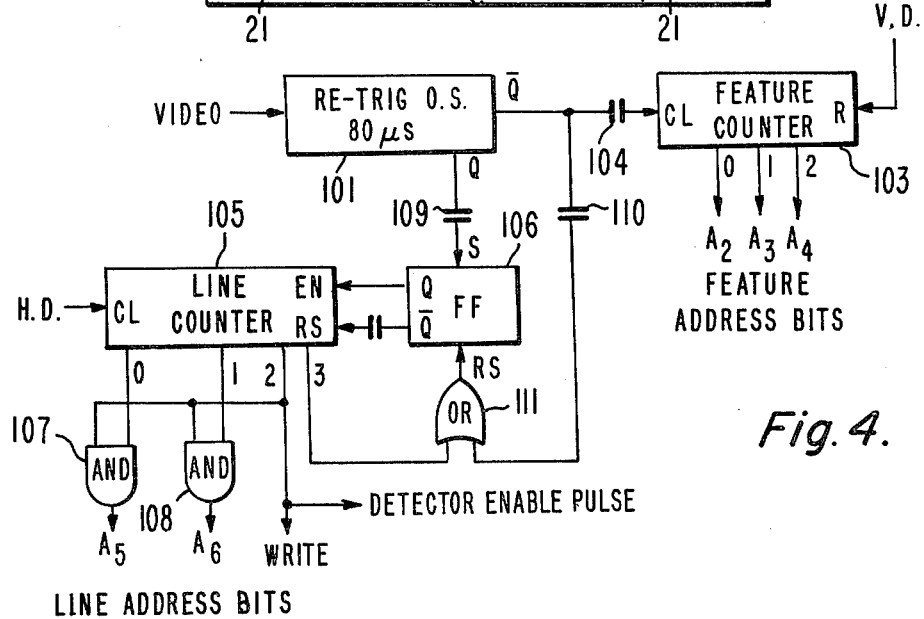
FIG. 4 is a diagram of each of the column counters or binary address generators in FIG. 3.

Referring to FIG. 4, there is illustrated a diagram of one of the three counters 45, 47, or 49 in FIG. 3. Video for the appropriate column is used to start a retriggerable one-shot monostable multivibrator 101 having a duration (80 microseconds) somewhat longer than a horizontal scan period. This output from one-shot monostable multivibrator 101 is a pulse that lasts through all scans of any feature (block or chevron). Thus since each scan the one-shot is retriggered there is provided a leading edge pulse at the top of the feature and a trailing edge pulse at the bottom of the feature plus one line. The trailing edge of this pulse causes a 3-bit counter 103 to be incremented, AC coupling this pulse via capacitor 104 to the clock input. This counter 103 provides a count of the number of features in the vertical column. The feature counter 103 output is the address word bits 2, 3, and 4. This counter is reset at the top of the raster by the vertical drive, assuring correct description of feature location by $A_2$, $A_3$, and $A_4$.

Because of the possibility of noise in the measurement of data, it is desired to measure the data redundantly. It is also desirable to measure the features well within the allocated area of the feature rather than at the leading edge. The system including the 4-bit line counter 105, flip-flop 106, and AND gates 107 and 108 perform both of these functions. The line counter 105 is clocked with horizontal sync pulse. The counter 105 is enabled by the output from the one-shot monostable multivibrator 101 on the leading edge of the generated pulse via coupling capacitor 109 and flip-flop 106. The leading edge of the triggered pulse from one-shot monostable multivibrator 101 is applied to the set input of flip-flop 106 causing it to change state and provide a high via output to the enable input of the 4-bit line counter 105. The line counter 105 counts four lines without any output address, detector enabling or write signals. Thus for four lines no measured data is stored in the memory. On the fifth line the counter 105 bit 2 terminal goes high, producing a detector enabling output, a write control signal, and enabling AND gates 107 and 108. The AND gate 107 is coupled to the 0-bit terminal of counter 105 and AND gate 108 is coupled to the 1-bit terminal of counter 105. This enabling signal at the start of the fifth horizontal line allows bits 0 and 1 to reach the address bit lines $A_5$ and $A_6$. Thus, addresses are generated for lines 5, 6, 7, and 8 after first detection of the feature. Thus anything that is detected as a feature, but having fewer than four horizontal lines will not produce enabling or address outputs. This provides further immunity to blemishes or other errors. The features on the chart 11 are designed to be 12 lines high so that the measured lines 5, 6, 7, and 8 are well centered. The flip-flop 106 is reset by the terminating pulse from one-shot monostable multivibrator 101 via capacitor 110 and OR gate 111. Also the flip-flop 106 is reset after line 8 by the No. 3-bit terminal output from counter 105 via OR gate 111.

We have shown that we can generate a 7-bit address word which will unambiguously describe any one of a number of features, keeping track of their order both horizontally and vertically. Their absolute positions are flexible, only requiring that all features in a column must be in their proper third of the picture. Vertical size, position, and rotation do not affect the vertical count, provided the features are crossed by at least eight scan lines, and are separated by at least two scan lines, within their column.

Spurious video will not misdirect data, provided the spurious image is less than 3 microseconds long and less than 5 scan lines high.

What is claimed is:

1. In an automatic setup unit for a television camera providing video signals when viewing a test pattern having features thereon, said unit including a digital memory for storing data indicative of measured values of the camera video according to memory addresses, a system for generating these memory addresses, comprising:
    means for detecting signal features for providing feature detection signals,
    means responsive to camera sync signals for providing first gating signals and first binary address signals indicative of a first horizontal width portion of the television raster and a second gating signal and a second binary address signal indicative of a second horizontal width portion of the television raster,
    means responsive to said first gating signal and said feature detection signals for generating third binary address signals corresponding to the order of the features detected in said first width portion of the television raster,
    means responsive to said second gating signal and said feature detection signals for generating fourth binary address signals corresponding to the order of the features detected in said second width portion of the television raster, and
    means responsive to said first and second gating signals and said binary addresses for applying to said memory said first and third binary address signals during said first gating signal and for applying to said memory said second and fourth binary address signals during said second gating signals.

2. The combination of claim 1 wherein said first means includes means for detecting the presence of a feature at two spaced time periods.

3. The combination of claim 1 including means responsive to horizontal drive signals from said camera and said feature detection signals for generating line addresses corresponding to the order of the horizontal lines of the features and means for applying said line address signals to said memory with the corresponding first or second addresses and third or fourth binary address signals.

4. The combination of claim 1 including means responsive to the horizontal drive signals from the camera and said feature detection signals for enabling storage of data into the memory only after a predetermined number of detected horizontal lines of the feature.

5. In an automatic setup unit for a television camera providing video signals when viewing a test pattern having features thereon, said unit including a digital memory for storing data indicative of measured values of the features according to memory addresses, a system for generating these memory addresses and controlling the data stored, comprising:
    first means for detecting said features for providing feature detection signals,
    second means responsive to camera sync signals for providing first second and third gating signals and first second and third address signals indicative of the left, center and right portion of the television raster, third means responsive to said first gating signal and said feature detection signals for generating fourth binary address signals corresponding each field to the order of the features detected on the left portion of the television raster, fourth means responsive to said second gating signal and said feature detection signals for generating fifth binary address signals corresponding each field to the order of the features detected in the center portion of the television raster, fifth means responsive to said third gating signal and said feature detection signals for generating sixth binary address signals corresponding each field to the order of the features detected in the right portion of the television raster, and means coupled to said second, third, fourth, and fifth means responsive to said first, second, and third gating signals and said address signals for applying to said memory said first and fourth binary address signals when said camera is scanning said left portion, said second and fifth binary address signals when said camera is scanning said center portion, and said third and sixth binary addresses when said camera is scanning said right portion.

6. In an automatic setup unit for a television camera providing video signals when viewing a test pattern having features thereon, said unit including a digital memory for storing data indicative of measured values of the features according to memory addresses, a system for generating these memory addresses and controlling the data stored, comprising:

first means for detecting said features for providing feature detection signals, second means responsive to camera sync signals for providing first second and third gating signals and first second and third address signals indicative of the left, center and right portion of the television raster, third means responsive to said first gating signals, said feature detection signals and the camera horizontal drive signals for generating fourth binary address signals corresponding each field to the order of the features detected and the horizontal line number of the feature on the left portion of the television raster, fourth means responsive to said second gating signal, said feature detection signals and the camera horizontal drive signals for generating fifth binary address signal corresponding each field to the order of the features detected and the horizontal line number of the feature on the center portion of the television raster, fifth means responsive to said third gating signal, said feature detection signals and the camera horizontal drive signals for generating sixth binary address signals corresponding each field to the order of the features detected and the horizontal line number of the feature on the right portion of the television raster, and sixth means coupled to said second, third, fourth, and fifth means, responsive to said first, second and third gating signals and said address signals for applying to said memory said first and fourth binary address signals when said camera is scanning said left portion, said second and fifth binary address signals when said camera is scanning said center portion, and said third and sixth binary addresses when said camera is scanning said right portion.

* * * * *